United States Patent [19]

Williams et al.

[11] Patent Number: 5,019,011
[45] Date of Patent: May 28, 1991

[54] CLOSURE FOR BROOD CHAMBER

[76] Inventors: John R. Williams, Rte. #1, Box 234, Hardeeville, S.C. 29927; Marion L. McLatchy, 610 Hwy. 278 HHI, Hilton Head Island, S.C. 29928

[21] Appl. No.: 394,521

[22] Filed: Aug. 16, 1989

[51] Int. Cl.⁵ ............................................. A01K 47/06
[52] U.S. Cl. ....................................... 449/27; 449/20; 449/25
[58] Field of Search ................... 449/7, 20, 27, 28, 46, 449/24, 25

[56] References Cited

U.S. PATENT DOCUMENTS

| 1,017,233 | 2/1912 | Rahn | 449/25 |
|---|---|---|---|
| 1,361,404 | 12/1920 | Pritchard . | |
| 1,363,922 | 12/1920 | Rowe | 449/25 |
| 1,468,995 | 9/1923 | Cottam | 449/25 |
| 1,482,468 | 2/1924 | Hershiser . | |
| 1,554,305 | 9/1925 | Sullivan . | |
| 1,556,254 | 10/1925 | Short . | |
| 1,652,539 | 12/1927 | Marks | 449/28 |
| 2,276,768 | 3/1942 | Flanagan . | |
| 2,358,431 | 9/1944 | Williams . | |
| 2,403,840 | 7/1946 | Ashurst | 449/28 |
| 2,449,348 | 9/1948 | Volgenau et al. | 449/25 |
| 3,408,668 | 11/1968 | Paoletti . | |
| 3,704,471 | 12/1972 | Bielby . | |
| 4,153,960 | 5/1979 | Simoni . | |
| 4,682,380 | 7/1987 | Martin | 449/7 |

FOREIGN PATENT DOCUMENTS

| 1085578 | 4/1984 | U.S.S.R. | 449/28 |
|---|---|---|---|
| 27080 | of 1911 | United Kingdom | 449/25 |

*Primary Examiner*—Robert P. Swiatek
*Attorney, Agent, or Firm*—John C. Bigler

[57] ABSTRACT

A housing has a length adjustable to match the length of the bee entrance of a common type of brood chamber and a width at least equal to the width of that bee entrance. The housing includes screened openings or other ventilation provision to permit air to pass through the bee entrance of the brood chamber. One or more arms or other clamping device on the housing holds the housing securely over the bee entrance to prevent bees from entering or leaving the brood chamber. The device facilitates transport of bees as well as laboratory control of African bees.

14 Claims, 3 Drawing Sheets

CLOSURE FOR BROOD CHAMBER

BACKGROUND OF THE INVENTION

The present invention relates to boxes, known as brood chambers, that are used in beekeeping and are adapted to house a beehive and honey chamber.

Conventional brood chambers usually include a main compartment shaped like a box. A bee entrance at the base of one side of the main compartment enables bees to pass into and out of the brood chamber. Bees are transported in such brood chambers during pollination season to areas where better food is available or to groves and fields for pollination of farm crops. When bees are transported in such brood chambers, the bee entrance at the base of the main compartment must be securely closed to prevent bees from entering or leaving the brood chambers.

Current methods for closing the bee entrance of such brood chambers include nailing or stapling wood strips or wire screen over the bee entrance. Such methods damage the brood chamber, causing premature decay of the structure. In addition, the nailing and stapling upsets the bees, causing swarming and suffocation of the bees. Alternatively, reinforced tape is used to close the bee entrance. Although that method may be less disruptive initially than methods requiring nailing and stapling, suffocation of the bees remains a serious problem.

Another problem with current methods of closing the bee entrance of brood chambers is the danger to motorists and others because bees occasionally escape from the brood chambers during transport. In such circumstances, the bees may be aroused sufficiently to sting innocent drivers and others in proximity to the brood chambers. In addition, the current methods of closing brood chambers are generally not reusable—new wood strips, wire screen, and reinforced tape must be used each time the brood chambers are to be closed.

Accordingly, an object of the present invention is to provide a closure for a brood chamber that does not require nailing or stapling and that does not otherwise upset or disrupt the bees.

It is a further object of the present invention to provide a closure for a brood chamber that allows adequate passage of air through the bee entrance so that bees do not suffocate when the brood chamber is closed.

It is a further object of the present invention to provide a closure for a brood chamber that is convenient and safe for a beekeeper closing and opening the brood chamber.

It is a further object of the present invention to provide a closure for a brood chamber that is secure during transport.

It is still a further object of the present invention to provide a closure for a brood chamber that is adjustable, simple in construction, inexpensive to manufacture, versatile, and light in weight.

The bee industry is important in the United States, not only because honey provides annual revenue of $150 million, but also because various farm crops having annual revenues of $20 billion depend on bee pollination. These industries are being threatened by aggressive African "killer" bees that are interbreeding with common, more docile and more productive European bees. In pursuing research to control African bees, laboratories may conveniently house and transport African bees in brood chambers if the brood chambers can be securely closed.

It is therefor a further object of the present invention to provide a closure for a brood chamber that is secure enough to prevent African bees from accidentally escaping from the brood chamber.

It is still a further object of the present invention to provide a closure for a brood chamber that can be used to prevent African bees from entering a brood chamber to interbreed with European bees within the brood chamber.

SUMMARY OF THE INVENTION

The present invention is directed to a novel device for closing the front opening of a bee brood chamber to prevent bees from entering and leaving the brood chamber. The brood chamber being closed is of a common type having a narrow rectangular front opening between a front wall and a bottom wall. The front opening serves as the bee entrance to the brood chamber.

The closure of the present invention has a housing that is variable in length to allow the housing to adjust to match the length of the front opening of the brood chamber. The housing has a width equal to or greater than the front opening of the brood chamber so that the housing can fully cover the front opening. A screened opening in the housing or other ventilation provision in the housing permits the passage of air through the housing and through the front opening of the brood chamber. A clamping means is provided on the housing to securely hold the housing over the front opening of the brood chamber.

The invention, together with further objects and attendant advantages, will be best understood by reference to the following detailed description of the preferred embodiment taken in conjunction with the accompanying drawings.

DETAILED DESCRIPTION OF THE PREFERRED EMBODIMENT

Figure 1:
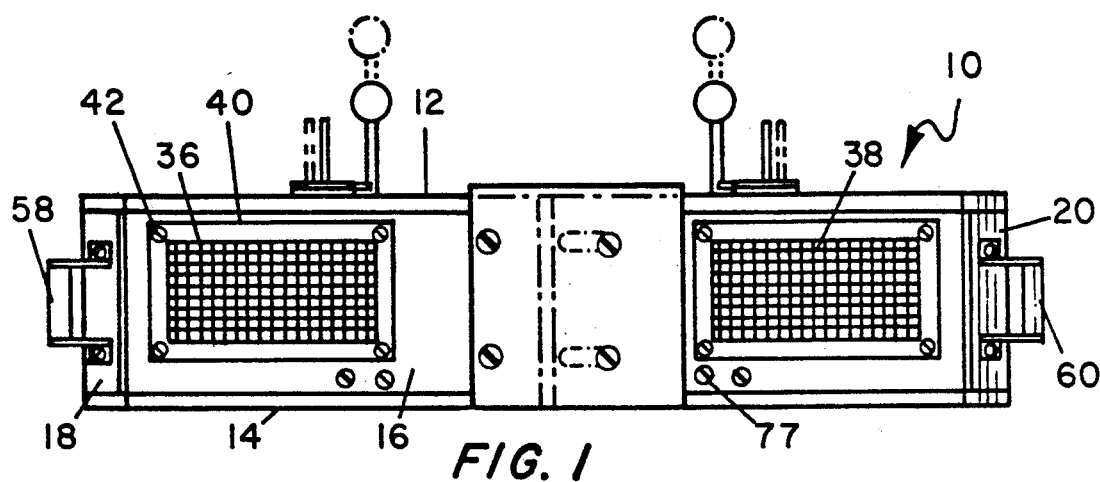
FIG. 1 is a front elevational view of a preferred embodiment of a closure for a brood chamber made in accordance with the present invention.
Figure 2:
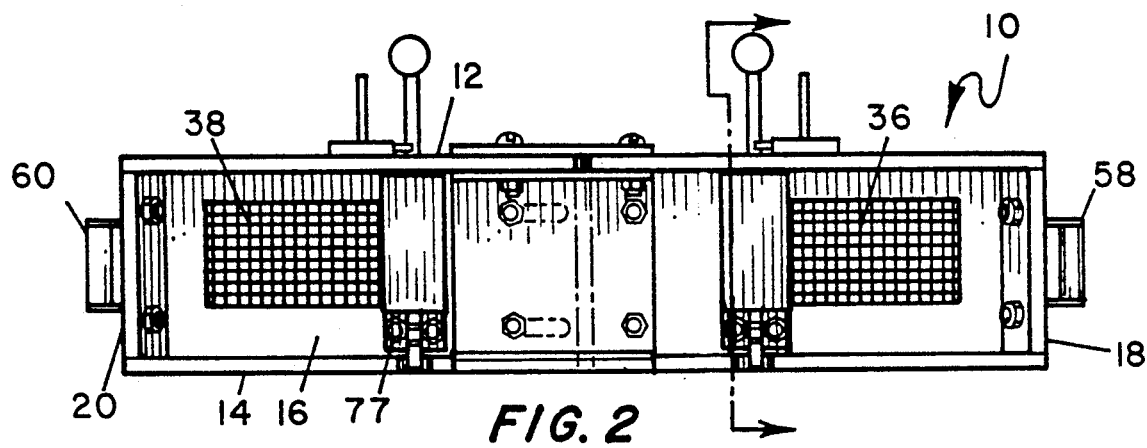
FIG. 2 is rear elevational view of the closure for a brood chamber shown in FIG. 1.
Figure 3:
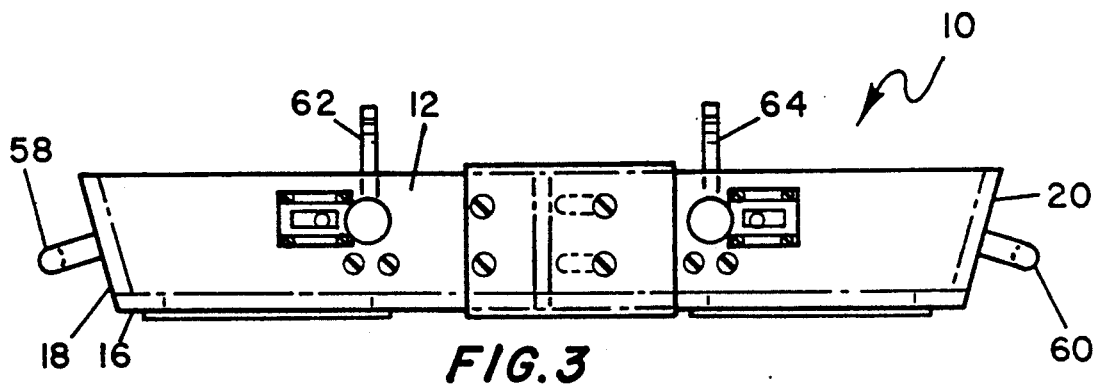
FIG. 3 is a top view of the closure for a brood chamber shown in FIG. 1.
Figure 4:
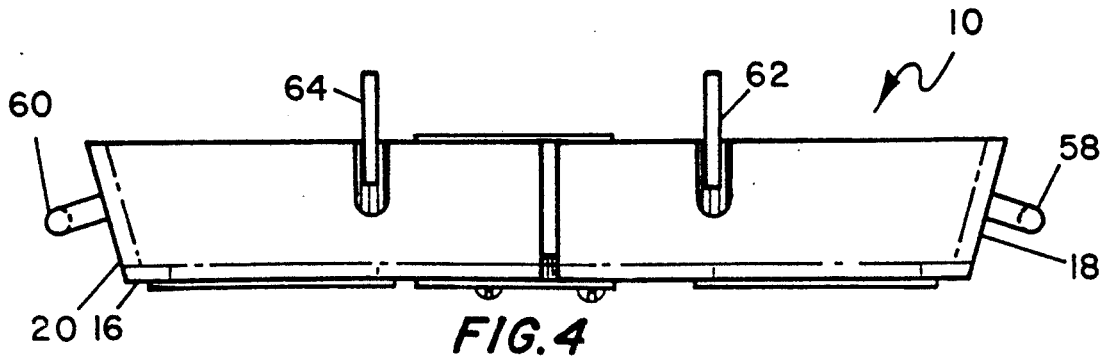
FIG. 4 is a bottom view of the closure for a brood chamber shown in FIG. 1.

With reference to the drawings, a preferred embodiment of a closure for a brood chamber made in accordance with the present invention is indicated generally by the numeral 10. The closure 10 includes an open rectangular box, or housing, having a top wall 12, a bottom wall 14, a front wall 16, and two angled end walls 18 and 20, as shown in FIGS. 1 through 4. The closure is open at the back. Although other materials may be used, the housing may be formed of plywood walls, glued and nailed together.

Figure 5:
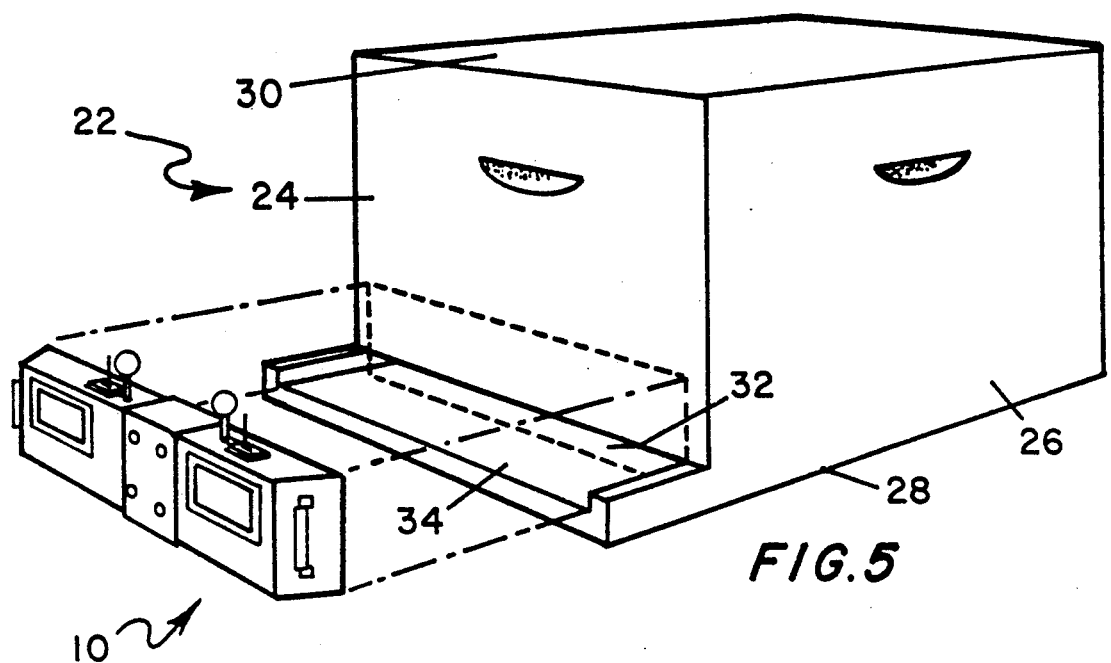
FIG. 5 is a perspective view of the closure for a brood chamber shown in FIG. 1, shown in relation to a brood chamber.

The closure 10 is shown in relation to a bee brood chamber of a well known type, indicated generally by the numeral 22 in FIG. 5. The brood chamber 22 is substantially cubical, having a front wall 24, a right side wall 26, a bottom wall 28, a top cover 30, a left side wall not shown, and a back wall not shown. To permit ingress and egress of the bees, the brood chamber 22 has a rectangular front opening 32 formed between the bottom surface of the front wall 24 and the top surface of the bottom wall 28. The bottom wall 28 extends forward beyond the front wall 24 to provide a platform 34 adjacent to the front opening 32.

When the closure 10 is positioned on top of the platform 34 and against the front wall 24 of the brood chamber 22, as indicated in FIG. 5, the closure 10 completely covers the front opening 32 of the brood chamber 22 to prevent the ingress and egress of bees. The front wall 16 of the closure 10 has two screened openings 36 and 38 to provide ventilation for the brood chamber 22 when the closure 10 is used. Screen material for the openings 36 and 38 is held in place by frames 40 made of galvanized steel sheet and secured by small wood screws 42.

Figure 7:
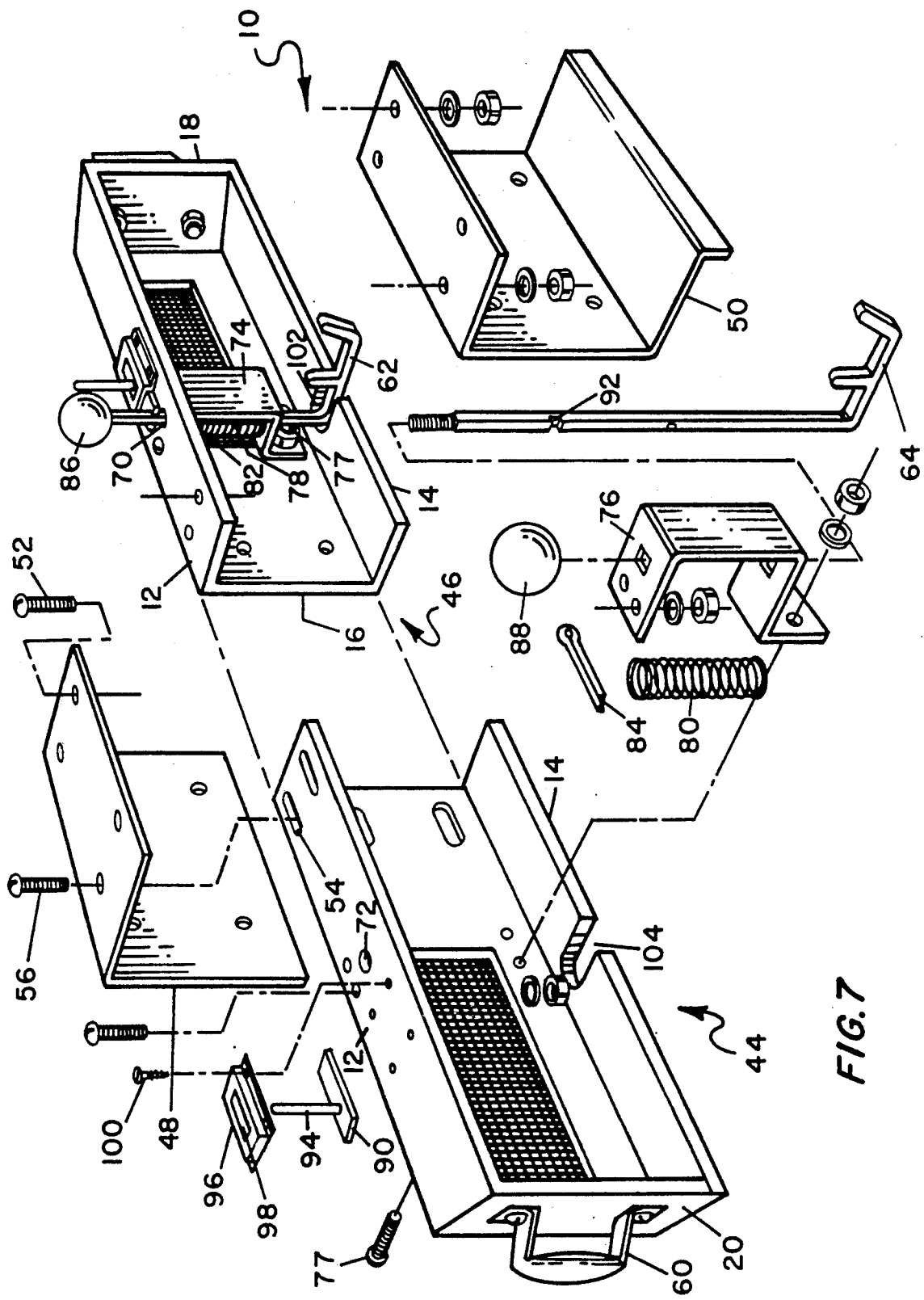
FIG. 7 is an exploded pictorial view of the closure for a brood chamber shown in FIG. 1.

Because the closure 10 must contact the ends of the front opening 32 to prevent passage of bees, and because individual brood chambers 22 may differ slightly in their dimensions, the closure 10 is variable in length. Although other means of providing adjustable length may be used, the housing of the preferred embodiment is made of two overlapping end portions, indicated generally by the numerals 44 and 46 in FIG. 7. The end portions 44 and 46 are slidably movable over each other to permit the housing to be shortened to a length less than that of the front opening 32 and to be lengthened to contact the ends of the front opening 32.

The end portion 46 has an L-shaped front plate 48 and a U-shaped rear plate 50 secured to the front and rear surfaces thereof so as to partially overly end portion 44 and provide a channel for movement of the end portion 44. The configurations of the front and rear plates 48 and 50 conform to the front and rear surfaces, respectively, of the top wall 12 and front wall 16 of the closure 10. The front and rear plates 48 and 50 may be secured by small bolts 52, as shown. Slots 54 in the end portion 44 receive other small bolts 56 to limit the longitudinal travel and increase rigidity of the housing of the closure 10.

In use, the closure 10 may be shortened to its minimum length before being placed over the front opening 32 of the brood chamber 22. Then, the two end portions 44 and 46 may be pulled away from each other until the housing of the closure 10 fits tightly against the ends of the front opening 32, thereby overcoming any variations in dimension from one brood chamber to another. Handles 58 and 60 are secured to the end walls 18 and 20 by small bolts or other means to facilitate safe positioning of the closure 10 against the front opening 32 and to aid in pushing and pulling the end portions 44 and 46 toward and away from each other.

Figure 6:
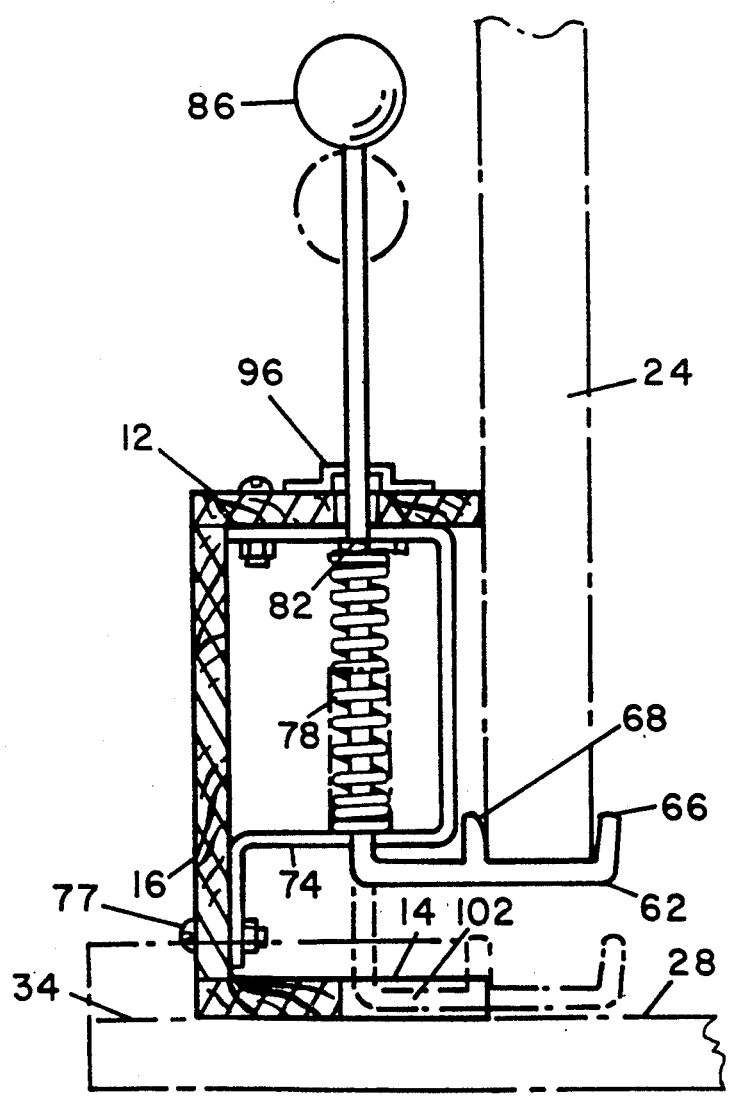
FIG. 6 is an enlarged sectional view of the closure for a brood chamber shown in FIG. 1, as indicated by the line 6—6 of FIG. 2, with portions of a brood chamber shown in phantom.

The closure 10 is clamped over the front opening 32 of the brood chamber 22 by arms 62 and 64 that are movable upward into contact with the lower surface of the front wall 24. As best shown in FIG. 6, the arms 62 and 64 have projections 66 and 68 that extend upward and are spaced apart by a distance corresponding to the thickness of the front wall 24. When the arms 62 and 64 are in their upward positions, the projections 66 are inside the brood chamber 22 and are behind the front wall 24, to prevent the closure 10 from moving outward from the brood chamber 22. The projections 68 are outside the brood chamber 22 and are in front of the front wall 24.

The sides of the projections 66 and 68 adjacent to the front wall 24 may be angled, diverging in the upward direction, as shown in FIG. 6. The angled surfaces of the projections 66 push against the back surface of the front wall 24 and pull the closure 10 against the front surface of the front wall 24. The angled surfaces of the projections 68 push against the front surface of the front wall 24. Together, the projections 66 and 68 facilitate the desired positioning of the closure 10 relative to the front wall 24 and ensure rigid attachment of the closure 10 to the brood chamber 22.

The arms 62 and 64 are substantially L-shaped, having horizontal portions movable to a position against the lower surface of the front wall 24 and vertical portions extending upward through openings 70 an 72 in the top wall 12 of the closure 10. The vertical portions are slidably mounted in brackets 74 and 76 made of galvanized steel sheet or other suitable material. The brackets 74 and 76 are secured to the interior surfaces of the top wall 12 and front wall 16 of the closure 10 by small bolts 77 or other means.

When viewed from the side, as in FIG. 6, the brackets 74 and 76 are somewhat P-shaped. The lower portion of the brackets is used for securing them to the front wall 16. The vertical portions of the arms 62 and 64 have a square cross-section and the horizontal portions of the brackets 74 and 76 have corresponding square opening sot receive the arms 62 an 64 and to prevent rotation of the arms relative to the brackets. Coil compression springs 78 and 80 encircle the vertical portions of the arms 62 and 64 within the space between the horizontal portions of the brackets 74 and 76.

Cotter pins 82 and 84 are inserted in transverse holes of the arms 62 and 64 to hold the springs 78 and 80 in compressed position and urge the arms 62 and 64 to their upper positions. The pins 82 and 84 also serve as stops to limit upward travel of the arms 62 and 64. Spherical knobs 86 and 88 are threadably mounted on the upper ends of the arms 62 and 64 to allow a user (positioned in front of the closure 10) to compress the springs 78 and 80 and push the arms to their lower positions to allow the closure to be removed from the brood chamber 22 when desired.

The arms 62 and 64 may be held in their lower positions by tab members 90 that are movable laterally into recesses 92 in the vertical portions of the arms 62 and 64. Small handles 94 extend upward from the tab members 90 to facilitate the lateral movement of the tab members. The tab members 90 are slidably mounted on the upper surface of the top wall 12 by hat-shaped sheet metal brackets 96 that provide a central channel for the tab members and a slot 98 for the small handles 94. The brackets 96 are secured by small wood screws 100 or other suitable means.

To permit maximum downward travel of the arms 62 and 64, the bottom wall 14 of the closure 10 has notches or openings 102 and 104 into which the arms may be lowered by pushing on the knobs 86 and 88. The recesses 92 are positioned on the vertical portions of the arms 62 and 64 such that they align with the tab members 90 when the arms are in this extreme low position. When the arms 62 and 64 are held in this low position by the tab members 90, the closure 10 is "cocked" and can be easily positioned over the front opening 32 of the brood chamber 22.

The springs 78 and 80 cause the arms 62 and 64 to push upward against the bottom surface of the front wall 24 of the brood chamber 22. In addition, the springs 78 and 80 cause the bottom wall 14 of the housing of the closure 10 to push downward against the bottom wall 28 of the brood chamber 22. As a result, the closure 10 is firmly held in position against the front wall 24 of the brood chamber 22 by frictional forces between the arms 62 and 64 and the front wall 24, and between the bottom wall 14 and the bottom wall 28. These frictional forces supplement the clamping action of the projections 66 and 68 described above.

In use, the closure 10 is shortened and is "cocked" as described above and is then positioned against the platform 34 and front wall 24 of the brood chamber 22, using the handles 58 and 60. Next, the handles 58 and 60 are used to pull the end portions 44 and 46 apart to lengthen the housing of the closure 10 to cover the ends of the front opening 32. Then, the knobs 86 and 88 are pushed down to release pressure on the tab members 90 and the tab members are moved laterally, by the small handles 94, out of the recesses 92, allowing the arms 62 and 64 to move upward at the urging of the springs 78 and 80 to hold the closure 10 tightly in position.

Removal of the closure 10 is the same as installation, but the order of the steps is reversed. Specifically, the knobs 86 and 88 are pushed down to lower the arms 62 and 64 to their lowest positions while the tab members 90 are moved laterally, by the small handles 94, into the recesses 92 of the arms 62 and 64. The closure 10 can then be removed from the brood chamber 22, holding the closure by the handles 58 and 60 on the end walls 18 and 20. If desired, the handles 58 and 60 may be pushed toward each other to shorten the housing of the closure 10 to facilitate withdrawal of the closure from the brood chamber 22.

In the preferred embodiment, two arms 62 and 64 are positioned along the length of the closure 10 to distribute the clamping forces. The housing of the closure 10 may e formed of a suitable plastic, by molding or otherwise, or of other appropriate material instead of being formed of plywood as described for the preferred embodiment.

From the foregoing, it will be apparent that the present invention provides a novel closure for a brood chamber that does not require nailing or stapling or other attachment that disrupts the bees. The closure provides adequate passage of air through the bee entrance of the brood chamber so that bees do not suffocate when the brood chamber is closed. The closure is also reusable, convenient and safe for a beekeeper closing or opening the brood chamber, and is secure during transport of bees in the brood chamber.

In addition, the closure of the present invention is secure enough to prevent African bees from escaping laboratory brood chambers that are used to house or transport African bees for research purposes. Also, the closure is suitable and safe for preventing African bees from entering a brood chamber to interbreed with European bees that are housed within the brood chamber. The closure is simple in construction, inexpensive to manufacture, light in weight, easy to use, detachable from the brood chamber, adjustable and versatile.

Of course, it should be understood that various changes and modifications to the preferred embodiment described above will be apparent to those skilled in the art. Additionally, various embodiments of the present invention may be adapted for specific brood chambers of other sizes and shapes. The present invention is not intended to be limited to use only in the form of the preferred embodiment. It is therefore intended that the foregoing detailed description be regarded as illustrative rather than limiting and that it be understood that it is the following claims, including all equivalents, that are intended to define the scope of this invention.

What I now claim is:

1. A closure for a brood chamber, the brood chamber being of the type having a front opening between a front wall and a bottom wall, to prevent ingress and egress of bees through the front opening, comprising:
   a housing having a length approximately the same as that of the front opening of the brood chamber and a width at least equal to that of the front opening of the brood chamber;
   adjusting means on the housing for varying the length of the housing to match the length of the front opening of the brood chamber;
   ventilating means within the housing to permit passage of air through the housing and through the front opening of the brood chamber; and clamping means on the housing for holding the housing securely over the front opening of the brood chamber, wherein the clamping means comprises at least one arm that is movable upward to a position behind the front wall of the brood chamber to prevent removal of the housing and movable downward to allow removal of the housing.

2. The closure for a brood chamber of claim 1 wherein the at least one arm is urged against the front wall of the brood chamber in its upward position, contacting lower and inward surfaces of the front wall adjacent the front opening of the brood chamber, and wherein the housing is urged against the bottom wall of the brood chamber, to secure the housing to the brood chamber.

3. The closure for a brood chamber of claim 2 wherein the at least one arm is shaped to contact the outer surface of the front wall of the brood chamber adjacent the front opening thereof as well as to contact the lower and inward surfaces adjacent the front opening thereof.

4. The closure for a brood chamber of claim 1 wherein the clamping means further comprises a spring urging the at least one arm to its upward position and holding means for keeping the at least one arm in its lower position, resisting the urging of the spring, when the housing is removed from the brood chamber.

5. The closure for a brood chamber of claim 4 wherein the at least one arm extends upward through the housing and terminates in a knob to permit manipulation of the at least one arm between its upper and lower positions by a user positioned in front of the brood chamber.

6. The closure for a brood chamber of claim 5 wherein the holding means comprises a member that can be moved laterally into a recess in the upward extension of the arm to resist the spring when the at least one arm is in the lower position and that can be moved laterally out of the recess to allow the at least one arm to move at the urging of the spring to its upper position.

7. The closure for a brood chamber of claim 4 wherein the at least one arm is substantially L-shaped, the horizontal portion thereof extending laterally so as to be movable against the lower surface of the front wall of the brood chamber and the vertical portion thereof extending upwardly through a coil spring mounted in the housing to provide the upward urging of the at least one arm.

8. The closure for a brood chamber of claim 7 wherein the horizontal portion of the at least one arm has upward projections for engagement with the rear and front surfaces of the front wall of the brood chamber to further secure the housing to the brood chamber.

9. The closure for a brood chamber of claim 1 wherein the number of arms is two, said arms being placed at positions along the housing to distribute the clamping force and prevent movement of the ends of the housing away from the front opening of the brood chamber.

10. The closure for a brood chamber of claim 1 wherein the housing comprises an open rectangular box having top, bottom, front and end walls, the absence of a back wall providing an opening to the box from the brood chamber.

11. The closure for a brood chamber of claim 10 wherein the ventilating means comprises at least one screened opening in the front wall of the housing.

12. The closure for a brood chamber of claim 10 wherein the housing rests upon the bottom wall of the brood chamber and wherein the top, front and end walls of the housing extend above the front opening of the brood chamber so as to be positioned in front of and against the front wall of the brood chamber.

13. A closure for a brood chamber, the brood chamber being of the type having a front opening between a front wall and a bottom wall, to prevent ingress and egress of bees through the front opening, comprising:
 a housing having a length approximately the same as that of the front opening of the brood chamber and a width at least equal to that of the front opening of the brood chamber;
 adjusting means on the housing for varying the length of the housing to match the length of the front opening of the brood chamber;
 ventilating means within the housing to permit passage of air through the housing and through the front opening of the brood chamber; and
 clamping means on the housing for holding the housing securely over the front opening of the brood chamber, wherein the adjusting means comprises the housing including two end portions, with one end portion being slidably movable over the other end portion to permit the housing to be shortened to a length less than that of the front opening of the brood chamber and to be lengthened to contact the end surfaces of the front opening of the brood chamber.

14. The closure for a brood chamber of claim 13 further comprising a handle on each of the end portions of the housing to aid in positioning the housing over the front opening of the brood chamber and to aid in pulling and pushing the ends of the housing relative to each other to lengthen and shorten the housing.

* * * * *

UNITED STATES PATENT AND TRADEMARK OFFICE
CERTIFICATE OF CORRECTION

PATENT NO. : 5,019,011

DATED : May 28, 1991

INVENTOR(S) : Williams

It is certified that error appears in the above-identified patent and that said Letters Patent is hereby corrected as shown below:

On the title page, item [76], delete

"; Marion L. McLatchy, 610 Hwy., 278 HHI,

Hilton Head Island, S.C. 29928"

Signed and Sealed this

Twenty-fourth Day of September, 1991

Attest:

HARRY F. MANBECK, JR.

*Attesting Officer*  *Commissioner of Patents and Trademarks*